United States Patent [19]

Powers

[11] Patent Number: 4,685,002
[45] Date of Patent: Aug. 4, 1987

[54] SLOW MOTION TELEVISION SYSTEM HAVING VARIABLE INTERLACE

[75] Inventor: Kerns H. Powers, Princeton, N.J.

[73] Assignee: RCA Corporation, Princeton, N.J.

[21] Appl. No.: 701,208

[22] Filed: Feb. 13, 1985

[51] Int. Cl.$^4$ ............................................. H04N 5/92
[52] U.S. Cl. ............................. 360/9.1; 360/10.1; 360/37.1; 358/152
[58] Field of Search ............... 360/9.1, 10.1, 33.1, 360/37.1; 358/335, 152, 140, 150

[56] References Cited

U.S. PATENT DOCUMENTS

| | | | |
|---|---|---|---|
| 3,617,626 | 11/1971 | Bluth | 358/311 |
| 3,803,352 | 4/1974 | Goldberger | 360/9.1 |
| 4,280,151 | 7/1981 | Tsunekawa | 360/9.1 |
| 4,298,888 | 11/1981 | Colles et al. | 358/140 |
| 4,307,421 | 12/1981 | Smit | 358/152 |
| 4,400,719 | 8/1983 | Powers | 358/11 |
| 4,415,931 | 11/1983 | Dischert | 338/11 |
| 4,496,995 | 1/1985 | Colles | 360/9.1 |
| 4,614,980 | 9/1986 | Ninomiya | 360/9.1 |

Primary Examiner—Alan Faber
Attorney, Agent, or Firm—P. J. Rasmussen; P. M. Emanuel; R. G. Coalter

[57] ABSTRACT

A slow motion system includes a variable interlace constant line-rate video camera, a variable speed recorder and a line-rate converter connected in cascade. During slow motion shooting the camera interlace ratio is increased, the recorder playback speed is reduced by the interlace ratio and the converter increases the line-rate of the recorded signal in proportion to the interlace ratio thereby providing a constant field-rate constant line-rate video output signal having a temporal resolution which increases as the interlace ratio increases.

10 Claims, 6 Drawing Figures

| INTERLACE FACTOR | FIELD RATE (HZ) | LINE RATE (HZ) | LINES PER FRAME | LINES PER FIELD |
|---|---|---|---|---|
| 1:1 | 60 | 45000 | 750 | 750 |
| 1:2 | 120 | 45000 | 750 | 375 |
| 1:3 | 180 | 45000 | 750 | 250 |

*Fig. 4*

| INTERLACE FACTOR | FIELD RATE (HZ) | LINE RATE (HZ) | LINES PER FRAME (SI') | LINES PER FIELD (SI') |
|---|---|---|---|---|
| 1:1 | 60 | 45000 | 750 | 750 |
| 1:2 | 120 | 45060 | 751 | $375\frac{1}{2}$ |
| 1:3 | 180 | 45120 | 752 | $250\frac{2}{3}$ |

*Fig. 5*

SLOW MOTION TELEVISION SYSTEM HAVING VARIABLE INTERLACE

FIELD OF THE INVENTION

This invention relates to television production apparatus and particularly to video systems for providing special effects such as slow motion.

BACKGROUND OF THE INVENTION

It is known that a slow motion video "special effect" may be obtained by recording the video signal on a suitable medium (e.g. disc or tape) and repeating fields of the recorded signal during playback. For example, half-speed slow motion may be obtained in a video tape recorder by scanning each recorded field twice before advancing the tape to the next field. Video tape recorders having such a variable speed playback feature are commercially available for the professional (i.e., studio) and consumer markets.

It has been recognized that the images obtained by conventional repeat field playback lack the qualities of smoothness of motion characteristic of slow motion film. The reason is that in film slow motion production, the camera is speeded up to take more pictures per second at a higher film and shutter speed thereby increasing the temporal resolution of recorded images and reducing the tendency for fast moving objects to jerk or to appear blurred. It would be desirable to apply the principles of slow motion film production to video production to provide a smoother and sharper slow motion image. To do this, one might consider increasing the camera scanning speed in a manner analogous to slow motion film cameras. While such an approach has the virtue of simplicity, it also has the disadvantage of rendering the bandwidth of the video signal a direct proportional function of the slow motion speed of the camera. The problem is that as camera speed is increased, the video signal bandwidth also increases until a point is reached where the video bandwidth exceeds the capability of the recorder used to ultimately provide playback of the signal. A further difficulty is that video tape (or disc) recorders are typically optimized to record signals of a given bandwidth and so where a number of slow motion speeds are desired it may be necessary to make substantial and complex modifications or adaptations of the recorder to accomodate varying bandwidths of the video signal.

SUMMARY OF THE INVENTION

It is herein recognized that a need exists for a variable speed slow motion video system having improved temporal definition and sharpness characteristic of slow motion film cameras and having a relatively constant video bandwidth independent of the "shooting" speed (i.e., a standard speed or one of a plurality of slow motion speeds). The present invention is directed to meeting that need.

A slow motion television system embodying the invention includes a camera means for providing a video output signal having a given line rate and having an interlace ratio. An interlace control switch means, coupled to the camera, varies the interlace ratio of the video output signal without substantially altering the line rate or bandwidth. A recording means, coupled to the camera means, records the video output signal at a given speed and reproduces the recorded signal at a speed inversely related to the interlace ratio to provide a reproduced video output signal having an effective temporal resolution which varies as a direct function of the interlace ratio selected by the interlace control switch means.

In accordance with a further aspect of the invention, a line rate conversion means is coupled to the recording means and responsive to the reproduced video output signal for interpolating additional lines thereby providing a processed video output signal having a given number of lines-per-field independent of the interlace ratio.

BRIEF DESCRIPTION OF THE DRAWING

The invention is illustrated in the occompanying drawing in which like elements are identified by like reference designators and in which:

FIGS. 4 and 5 are tables summarizing scanning parameters of the cameras of FIGS. 2 and 3, respectively.

DETAILED DESCRIPTION

Figure 1:
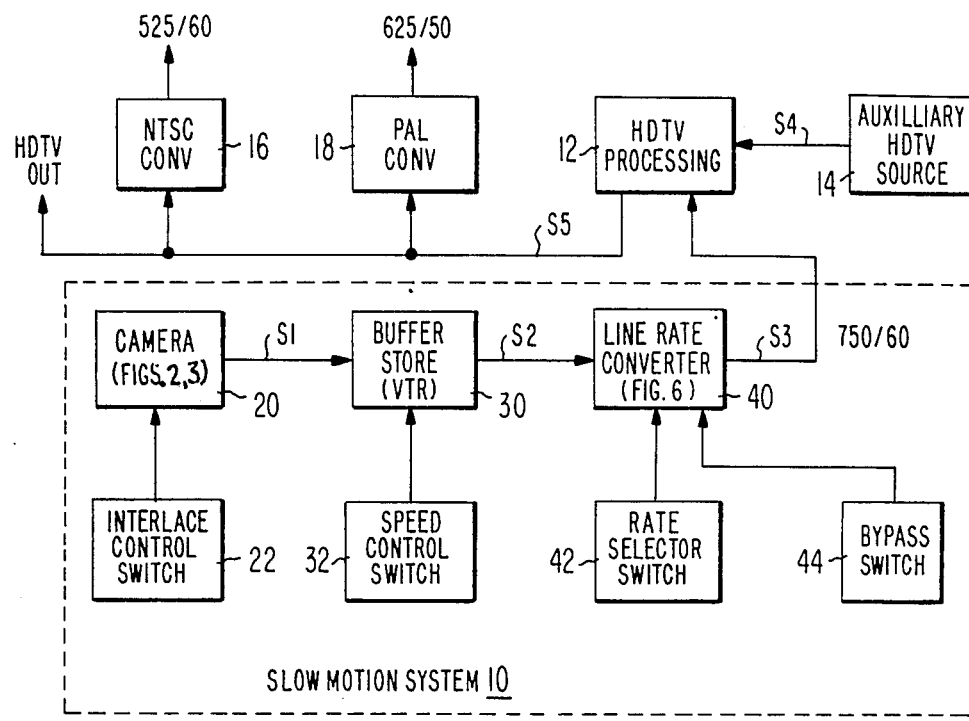
FIG. 1 is a block diagram of a slow motion television system embodying the invention.

FIG. 1 illustrates a preferred application of the principles of the invention in which the slow motion system 10 (outlined in phantom) embodying the invention is used as a source of standard-speed and slow motion video signals in a high definition television (HDTV) production system. The production system comprises a HDTV processing unit 12 coupled to receive video signals S3 and S4 from system 10 and from an auxilliary HDTV source 14, respectively, and to supply a processed signal S5 to standard definition NTSC and PAL converters 16 and 18, respectively, and to HDTV distribution media. Unit 14 may comprise a live camera, a video tape recorder (VTR), a film scanner, another slow motion system or some other suitable source of HDTV signals. Unit 12 may comprise editing equipment, special effects generators or other suitable production processing equipment. A preferred video signal format employed in the production system comprises 750 lines-per-frame, non-interlaced, with a 60 per-second frame (and field) rate and a 45 KHz line rate. This production signal format is advantageous in that, for example, it simplifies processing such as editing and color keying, it provides high definition video images free of motion artifacts and it is readily transcodeable to standard definition formats such as film or broadcast television (e.g., NTSC, PAL or SECAM). The principles of the present invention are of general utility, however, and it will be appreciated that video signal parameters such as number of lines, line-rate or field-rate may be other than the preferred values.

Figure 2:
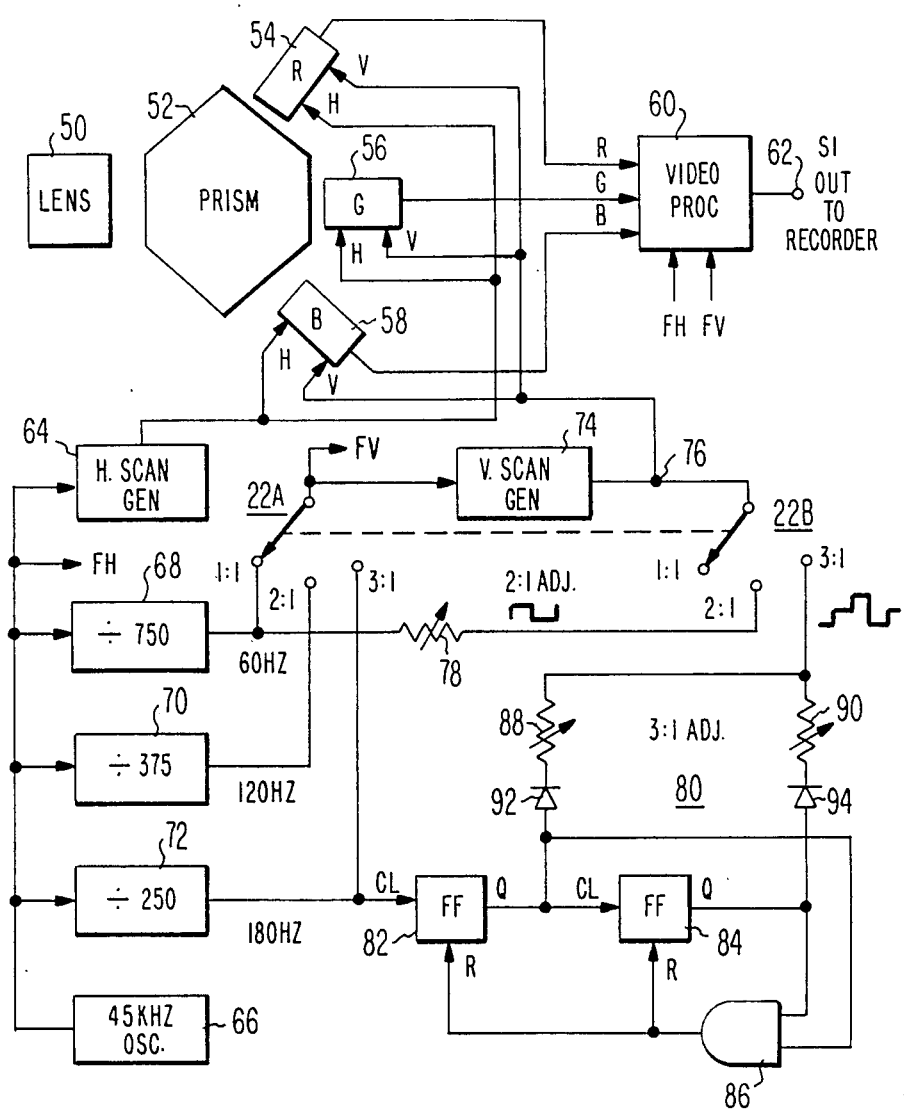
FIGS. 2 and 3 are block diagrams of special effect video cameras suitable for use in the system of FIG. 1.
Figure 3:
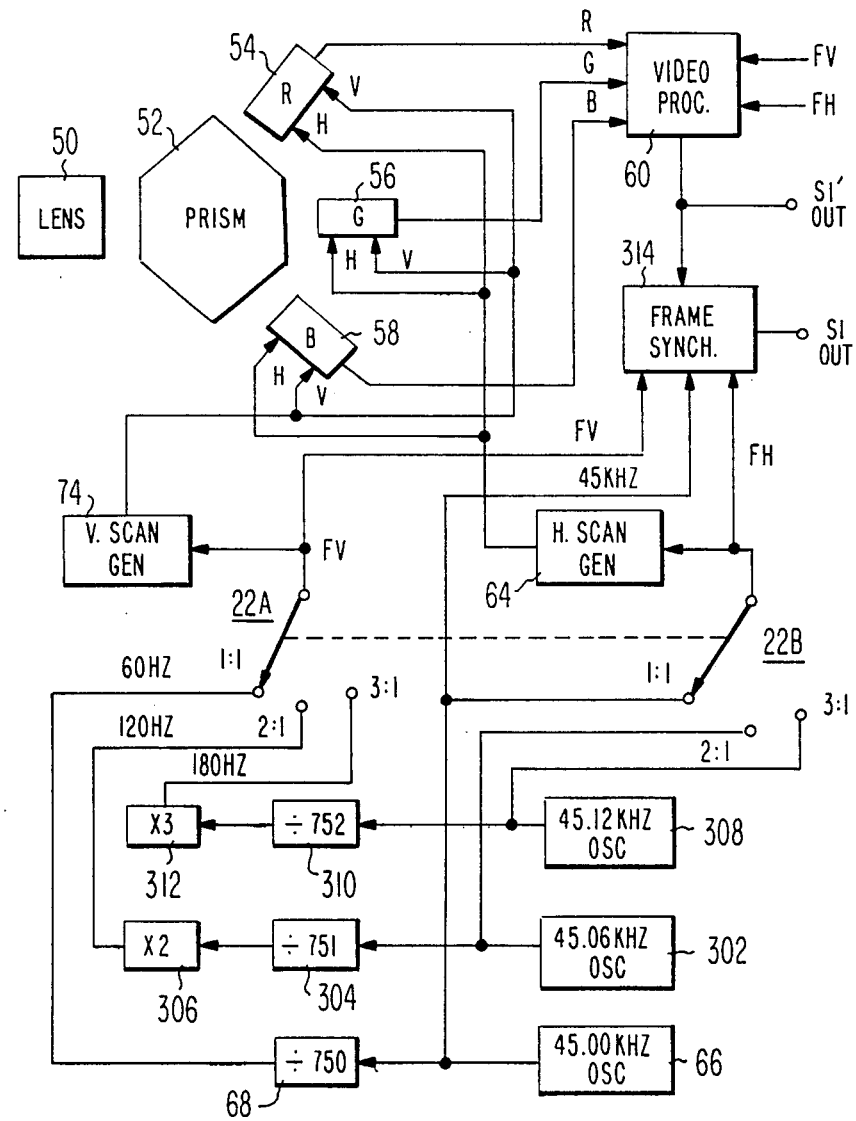

Slow motion system 10, embodying the invention, comprises a cascade connection of a camera 20, a buffer store 30 and a line-rate converter 40. Camera 20 provides a video output signal S1 having a substantially constant line-rate of 45 KHz to buffer store 30. An interlace control switch 22, coupled to camera 20, varies the interlace ratio of video signal S1 without substantially altering the line-rate. FIGS. 2 and 3 (described subsequently) are exemplary of variable interlace cameras suitable for use in system 10.

The term "interlace ratio", as used herein, is a short hand way of denoting the number of non-overlapping fields that comprise a frame of a raster scanned image. In broadcast television there are two fields per frame and thus the interlace ratio equals "2" (this is sometimes expressed by the notation "2:1"). In progressively scanned television systems each frame comprises a single field. In such non-interlaced systems the "interlace ratio" equals unity and is denoted by "1" or "1:1" herein.

Camera 20, under the control of switch 22, varies the interlace factor of signal S1 between values of 1:1, 2:1 and 3:1. Interlace of 1:1 is used when imaging scenes in a standard speed (i.e. non-slow motion) operating mode. Interlace of 2:1 or 3:1 is selected when operating camera 20 in slow motion modes. With 2:1 interlace the vertical field rate and the exposure or shutter speed of camera 20 are doubled, thus doubling the temporal resolution of the images represented by signal S2. Since the field-rate is doubled (120 fields-per-second) and the line-rate is constant (45 KHz), the number of lines-per-field is reduced by one half from 750 to 375. This represents a loss in vertical resolution equal to the reciprocal of the interlace ratio. What is gained, importantly, is that the temporal resolution has been doubled since twice as many "pictures" are imaged each second yet the bandwidth of the signal has not increased. Also the horizontal resolution has been increased for laterally moving objects because of the shorter camera exposure time. One may thus freely select higher interlace factors (e.g. 3:1, 4:1 etc.) for increased temporal resolution of scenes with fast action to thereby minimize image blur due to motion without regard to bandwidth limitation of the buffer storage device ultimately used for storing the video signal.

The variable interlace constant line-rate video signal S1 provided by camera 20 is stored in buffer store 30 and recovered at a speed equal to the reciprocal of the interlace ratio by means of a speed control switch 32. Buffer store 30 may comprise a video tape recorder (VTR, as shown) or some other suitable storage device such as a video disc recorder or a random access memory (RAM). The "playback" speed of a RAM storage device may be varied as is known by placing a divider in the RAM read clock lines to divide the read clock signal frequency by the interlace ratio. The playback speed of video tape recorders or optical or magnetic disc recorders may similarly be reduced in known manner by reducing the scanning speed of the signal recovery device relative to the storage medium. Regardless of the storage medium employed, it is essential for purposes of the present invention, that the playback speed be controlled by a factor that equals the reciprocal of the interlace ratio selected by interlace control switch 22 of camera 20.

The video output signal S2 of buffer store (VTR) 30 will have a constant field rate and a line rate which decreases as the playback speed decreases. For example during non-slow motion operation (1:1 interlace) signal S2 is recovered at the same speed it is recorded and so it will be identical to the recorded signal S1, namely, 750 lines-per-field at line-rate of 4.5 KHz and a field-rate of 60 Hz. During half-rate slow motion operation (2:1 interlace) the playback speed is halved so that signal S2 will have a reduced line-rate of 22.5 KHz comprising 60 fields-per-second of 375 lines-per-field. At one-third rate slow motion the line rate reduces to 15 KHz comprising 60 fields-per-secord of 250 lines-per-field video.

The number of lines-per-field of the video signal S2 is made independent of the interlace ratio by means of line-rate converter 40 having a rate selector switch 42 and a bypass switch 44. As previously noted, signal S2 has a line-rate and a field-rate equal to the production standard (750/60) when system 10 is operated in the standard non-slow motion mode (interlace 1:1). In this mode line-rate conversion is not required and bypass switch 44 is activated to efficiently disable converter 40. For each slow motion speed, however, a different line-rate conversion is needed to conform signal S3 to the line-rate of the desired production standard. For half-speed slow motion operation, switch 44 enables converter 40 to double the number of lines-per-field. For one-third speed, slow motion unit 40 triples the number of lines-per-field. Accordingly, the output signal S3 of slow motion system 10 exhibits a constant line-rate and a variable temporal resolution provided by camera 20, a constant field-rate provided by buffer store 30 and a constant number of lines-per-field provided by line-rate converter 40.

Figure 6:
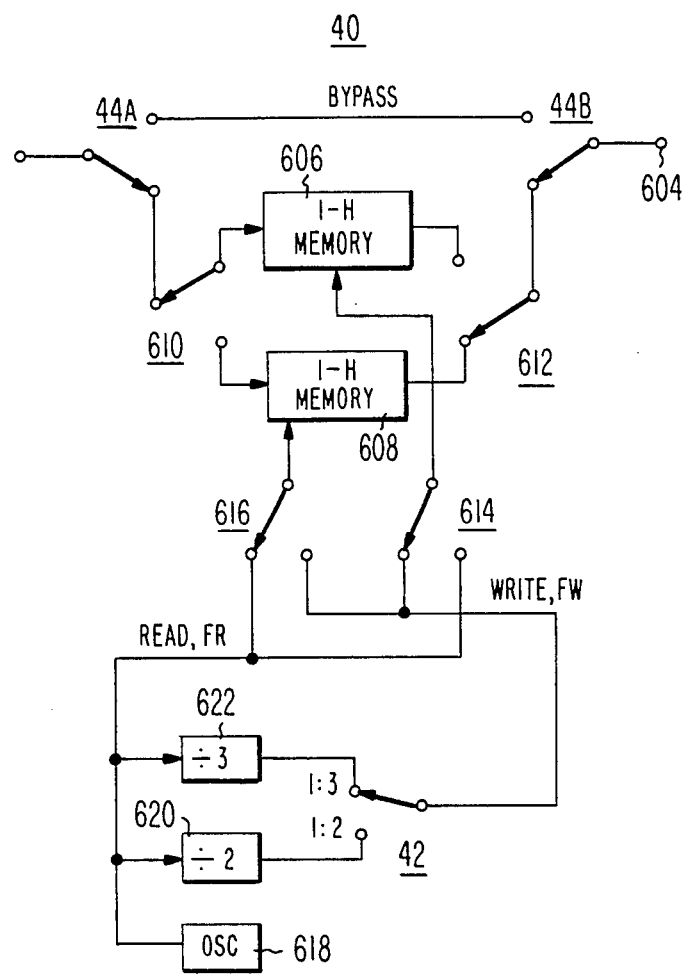
FIG. 6 is a block diagram of a variable line-rate converter suitable for use in the system of FIG. 1.

For purposes of the present invention, unit 40 may be of either an interpolating or a line-repeat type of line-rate converter. K. H. Powers describes a suitable interpolating interlace to non-interlace line-rate converter in U.S. Pat. No. 4,400,719 incorporated herein by reference. R. A. Dischert describes a suitable non-interpolating interlace to non-interlace (line repeating) converter in U.S. Pat. No. 4,415,931 incorporated herein by reference. FIG. 6, discussed subsequently, is exemplary of a variable line-rate converter suitable for use in system 10 where multiple slow motion speeds are desired.

Camera 20 may be implemented as shown in FIG. 2. The camera comprises a lens 50 which focuses light from a scene through a prism 52 to red, green and blue image sensor devices (imagers) 54, 56 and 58, respectively. Red, green and blue (R, G, B) output signals representative of the raster scanned image provided by imagers 54–58 are applied to a video processing unit 60 which provides such conventional functions as preamplification, gamma correction, matrixing and blanking insertion to form the camera output signal S1 at output terminal 62.

The horizontal scan signal (H) for imagers 54, 56 and 58 is provided by a horizontal scan generator 64 which is triggered by an oscillator 66. The frequency of the horizontal oscillator 66 in this example of camera 20 equals 45 KHz and is independent of the camera interlace ratio. Accordingly, the line-rate of the video output signal equals that of the desired production standard (45,000 lines-per-second) for all camera interlace ratios.

Interlace is controlled in camera 20 by switch 22 which has a first section 22A for controlling the field-rate of the video output signal S1 and a second section 22B for controlling the field-to-field vertical positions of the scanning lines of the imagers 54–58. In this particular example of camera 20 switch section 22B is coupled to supply a vertical scan position modifying signal to the imagers.

Switch section 22A controls the vertical field-rate by selectively coupling the output of three dividers 68, 70 and 72 to a vertical scan generator 74 that supplies a vertical scan signal (V) to imagers 54–58. Dividers 68, 70 and 72 divide the output (45 KHz) of oscillator 66 by factors of 750, 375 and 250, respectively, thereby providing vertical scan frequencies of 60, 120 and 180 Hz, respectively. In the 1:1 interlace mode the 60 Hz field-rate is selected. For 2:1 and 3:1 interlace modes, the 120 Hz and 180 Hz field-rates are selected.

Varying the field-rate is necessary for controlling the interlace ratio of video signal S1. It is not, however, sufficient since some means must be provided for ensuring that the scan lines of different fields scan different positions of the image. This interlacing function is provided by switch section 22B which adds a vertical offset signal at node 76 to the output of vertical scan generator 74. In the 1:1 (non-interlaced) mode switch 22B is in an open circuit position and so imagers 54–58 scan the same lines in each field. In the 2:1 interlace mode switch, 22B couples the 60 Hz signal to node 76 via a variable resistor 78. Resistor 78 is adjusted so that the scan lines of each field are midway between the scan lines of the preceding field.

In the 3:1 interlace mode switch 22B couples the output of a "stair-case" generator 80 to node 76. Generator 80 comprises a pair of cascade connected flip flops 82 and 84 clocked by divider 72 and having an AND gate 86 coupled from their "Q" outputs to their reset R inputs thereby forming a divide by three counter having the state sequence 00, 01 and 10. Variable resistors 88 and 90 couple the Q outputs if flip flops 82 and 84, respectively, to switch 22B. Diodes 92 and 94 in series with resistors 88 and 90, respectively, prevent reverse current flow from node 76 when the counter state is 00 corresponding to field "one" of a three field sequence. Resistors 88 and 90 are adjusted to control the vertical position of the scan lines of fields "two" and "three", with respect to field "one" so as to be non-overlapping. The table of FIG. 4 summarizes the scanning parameters of the camera. As previously noted, the line-rate is constant (45 KHz), the field-rate varies directly as the interlace ratio and the number of lines-per-field varies inversely as the interlace ratio.

Camera 20 of FIG. 2 may be modified as shown in FIG. 3 to obtain variable interlace in a different manner. Switch section 22A functions as before to select field-rates of 60, 120 and 180 Hz corresponding to interlace modes of 1:1, 2:1 and 3:1, respectively. The 60 Hz signal is provided by oscillator 66 and divider 68 as in FIG. 2. The 120 Hz signal is provided by a cascade connection of a 45.06 KHz oscillator 302, a divider 304 which divides the oscillator 302 output by 751 and a multiplier 306 which multiplies the divider output by 2 whereby the 120 Hz vertical synchronizing signal is locked to a line-rate of 45.06 KHz. The 180 Hz signal is provided by a cascade connection of a 45.12 KHz oscillator 308, a divide-by-752 divider 310 and a multiplier 312 which triples the frequency of the divider 310 output signal whereby the 180 Hz vertical synchronizing signal is locked to a line frequency of 45.12 KHz. Switch section 22B couples the outputs of the line frequency oscillators 66, 302 and 308 to horizontal sweep generator 64 for operating modes of 1:1, 2:1 and 3:1, respectively.

Operation of the modified camera is illustrated by the table of FIG. 5. For 1:1 interlace operation oscillator 66 sets the line-rate to 45,000 Hz and divider 68 sets the field-rate to 60 Hz. For 2:1 interlace (half rate slow motion) oscillator 302 sets the line-rate to 45,060 Hz. Divider 304 and doubler 306 set the field-rate to 120 Hz whereby the output signal (S1 of processor 60 comprises two 375.5 line fields per frame of 751 lines. For 3:1 interlace (one-third rate slow motion) oscillator 308 sets the line-rate to 45,120 Hz. Divider 310 and tripler 312 set the field-rate to 180 Hz whereby the output signal S1' of processor 60 comprises three 250 and $\frac{2}{3}$ line fields per frame of 752 lines. The fractional portion of a line (e.g., $\frac{1}{2}$ and $\frac{2}{3}$) in each field in the 1:2 and 1:3 slow motion operating modes ensures that the fields are interlaced without need for the vertical scan offsetting signal employed in the camera of FIG. 2. Signal S1' has a substantially constant line-rate regardless of the interlace ratio. The small line rate frequency variation (less than one-half of one percent) may be removed from signal S1', if desired, by retiming the signal by dropping one line per field in the 2:1 interlace mode and two lines per field in the 3:1 interlace mode. This is provided for in FIG. 3 by a frame synchronizer 314 which receives the vertical and horizontal synchronizing signals FV and FH provided by switch sections 22A and 22B and retimes signal S1' in synchronism with the 45 KHz line-rate signal provided by oscillator 66. As a result, the retimed output signal S1 format corresponds to that shown in the table of FIG. 4.

The line-rate converter 40 of FIG. 6 is similar to the line repeating type described in the aforementioned Dischert patent No. 4,415,931 but modified to provide the functions of variable rate conversion and bypassing. The bypass function is provided by switch 44 having two single-pole two-position sections 44A and 44B arranged to couple signal S2 at input terminal 602 to output terminal 604 when the bypass mode is desired. Alternatively, converter 40 may be effectively disabled or bypassed without the use of switch 44 by applying read-write clock signals of equal frequency to one-line (1-H) memories 606 and 608 as will be explained.

With switch 44 in the non-bypass position as shown, signal S2 is alternately stored or "written" into memories 606 and 608 by means of an input switch 610 operated at one-half the horizontal line frequency of signal S2. As one memory is being written, the signal previously stored in the other memory is recovered or "read" and supplied to output terminal 604 by means of an output switch 612 operated at one-half the line-rate of signal S2.

Read (FR) and write (FW) clock signals are supplied to memories 606 and 608 via clock switches 614 and 616, respectively, which are operated at half the line rate of the video signal S2 and which are phased such that FW is applied to memory 606 and FR is applied to memory 608 when switch 610 is in the position shown. The frequency of the write clock signal is selected to be equal to the frequency of the read clock signal divided by the interlace ratio so that as one memory is being written with a current line of video, the other will be read N-times where N equals the interlace ratio thereby repeating the stored line and thus increasing the line-rate of the output signal.

The read clock signal FR is provided by a fixed frequency oscillator 618 since the output signal S3 is to have a constant line-rate for either value of the interlace ratio. The variable write clock frequency FW is obtained by dividers 620 and 622 which divide FR by factors of two and three, respectively. Switch 42 is operated to couple the output of divider 620 to read-write switches 614 and 616 during half-rate slow motion operation (2:1 interlace) to double the line-rate and to couple the output of divider 622 to read-write switches 614 and 616 during one-third rate slow motion operation (3:1 interlace) of the system to triple the line-rate.

Bypass switch 44 may be deleted by adding another position to switch 42 to couple the output of oscillator 618 (FR) to read-write switches 614 and 616 in standard speed (non-slow motion) operation of the system. This causes FR to equal FW so that the input and output line-rates will be equal which, functionally, is equivalent to bypassing converter 40.

What is claimed is:

1. A slow motion television system, comprising:
   camera means having an output for providing a video output signal having a substantially constant line rate and having an interlace ratio;
   interlace control switch means coupled to said camera means for varying said interlace ratio without substantially altering said line rate for causing said video output signal of said camera means to exhibit a substantially constant bandwidth independent of variations in said interlace ratio; and
   storage means coupled to said camera means for recording said video output signal at a given speed and for reproducing the recorded signal at a recovery speed inversely related to said interlace ratio to provide a reproduced video output signal having an effective temporal resolution which varies as a direct function of said interlace ratio, said recovery speed being selected such that said reproduced video output signal exhibits a constant field rate for all values of said interlace ratio and a line rate which varies inversely with said interlace ratio.

2. A slow motion television system as recited in claim 1 further comprising:
   controllable line rate conversion means coupled to said recording means and responsive to said constant field rate, variable line rate reproduced video output signal for providing a processed video output signal having said constant field rate of said reproduced video output signal and a line rate equal to said substantially constant line rate of said camera means.

3. A slow motion television system as recited in claim 2 wherein said conversion means comprises line interpolation means for repeating lines of said reproduced video output signal a predetermined number of time as a direct function of said interlace ratio of said camera means.

4. A slow motion television system as recited in claim 2 wherein said interlace control switch means includes a first control section for controlling the field rate of said video output signal and a second control section for controlling the field-to-field vertical position of the scanning lines of said video output signal.

5. A slow motion television system as recited in claim 4 wherein said second control section of said switch means is coupled to supply a vertical scan position modifying signal to said camera means.

6. A slow motion television system as recited in claim 4 wherein said second control section of said switch means is coupled to said camera means for modifying the line rate of said video output signal as a function of said interlace ratio.

7. A slow motion television system comprising:
   imaging means having an output for providing a video output signal representative of a raster scanned scene, said video output signal having an interlace ratio;
   scan circuit means coupled to said imaging means for controlling the line rate and the field rate of said video output signal; and
   control means coupled to said scan circuit means for imparting variable interlace to said video output signal and simultaneously maintaining said line rate at a substantially constant value whereby said video output signal exhibits a substantially constant bandwidth and a temporal resolution which increases as a direct function of said interlace ratio;
   means for recording said video output signal and for playing back the recorded signal at a speed inversely related to said interlace ratio to provide a reproduced video output signal, said speed being selected such that said reproduced video output signal exhibits a constant field rate for all values of said interlace ratio and a line rate which varies inversely with said interlace ratio; and
   means for interpolation lines of the reproduced video singal a predetermined number of times as a function of said intelace ratio to provide a processed video output signal in non-interlaced form in which the number of lines per field or frame is independent of said interlce ratio and equal to the total number of lines per frame of said video output signal provided by imaging means.

8. A slow motion television system as recited in claim 7 wherein said control means includes switch means for varying the field rate of said scan circuit means as a function of said interlace ratio.

9. A slow motion video system, comprising:
   camera means having an output for providing a video output signal having a substantially constant line rate;
   interlace control switch means in said camera means having a first position for placing said camera means in a first operating mode in which said video output signal is of non-interlaced form and having a second position for placing said camera means in a second operating mode in which video output signal is interlaced by a given interlace ratio, said video output signal having an increased field rate in said second operating mode and said substantially constant line rate in both said operating modes; and
   means for recording said video output signal and for playing back the recorded signal at a speed inversely related to said interlace ratio to provide a reproduced video output signal having a constant field rate in both said operating modes and a line rate which decreases in said second operating mode to a value equal to said line rate of said camera means divided by said interlace ratio.

10. A slow motion video system as recited in claim 9 further comprising line rate coversion means coupled to said recording means for coverting said reproduced video output signal to a processed video output signal having said constant field rate and said substantially constant line rate in both said operating modes.

* * * * *